(12) United States Patent
Manabe et al.

(10) Patent No.: US 7,597,820 B2
(45) Date of Patent: Oct. 6, 2009

(54) LIQUID CRYSTAL-CONTAINING COMPOSITION, METHOD OF PRODUCING THE SAME, THE LIQUID CRYSTAL DISPLAY DEVICE INCLUDING THE SAME

(75) Inventors: Chikara Manabe, Kanagawa (JP); Naoki Hiji, Kanagawa (JP); Shigeru Yamamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 39 days.

(21) Appl. No.: 11/902,433

(22) Filed: Sep. 21, 2007

(65) Prior Publication Data
US 2008/0187687 A1 Aug. 7, 2008

(30) Foreign Application Priority Data
Feb. 5, 2007 (JP) ............................. 2007-026025

(51) Int. Cl.
*C09K 19/00* (2006.01)
*C09K 19/06* (2006.01)
*C09K 19/52* (2006.01)

(52) U.S. Cl. .................... 252/299.01; 428/1.1; 428/1.2; 428/1.3; 430/20

(58) Field of Classification Search .................. 428/1.1, 428/1.2, 1.3; 430/20; 252/299.01
See application file for complete search history.

(56) References Cited

U.S. PATENT DOCUMENTS 7,387,856 B2 * 6/2008 Chari et al. .................. 430/20
7,465,480 B2 * 12/2008 Hiji et al. ..................... 428/1.2

FOREIGN PATENT DOCUMENTS

| JP | A-05-080303 | 4/1993 |
| JP | A-06-051284 | 2/1994 |
| JP | A-07-098449 | 4/1995 |
| JP | A-08-320505 | 12/1996 |
| JP | A-11-249119 | 9/1999 |

* cited by examiner

*Primary Examiner*—Geraldina Visconti
(74) *Attorney, Agent, or Firm*—Oliff & Berridge, PLC

(57) ABSTRACT

A liquid crystal-containing composition according to the present invention includes a cholesteric liquid crystal, a polymer, and particles having hydrophobic surfaces. The particles having hydrophobic surfaces are at the interface between the region containing the cholesteric liquid crystal and the region containing the polymer.

14 Claims, 14 Drawing Sheets

(A) INSIDE OF CAPSULES
(B) OUTSIDE OF CAPSULES
(EXAMPLE 0)

(EXAMPLE 4)

○ : BRIGHT DISPLAY STATE BEFORE TEST
■ : BRIGHT DISPLAY STATE AFTER TEST
▲ : DARK DISPLAY STATE BEFORE TEST
△ : DARK DISPLAY STATE AFTER TEST

FIG. 10 (EXAMPLE 4)

(A) INSIDE OF CAPSULES  (B) OUTSIDE OF CAPSULES (COMPARATIVE EXAMPLE 1)

(A) INSIDE OF CAPSULES   (B) OUTSIDE OF CAPSULES
(COMPARATIVE EXAMPLE 2)

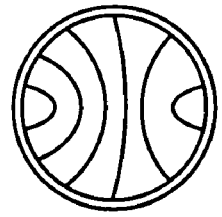
FIG. 14A
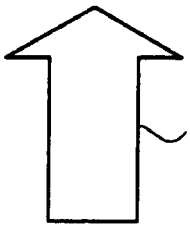
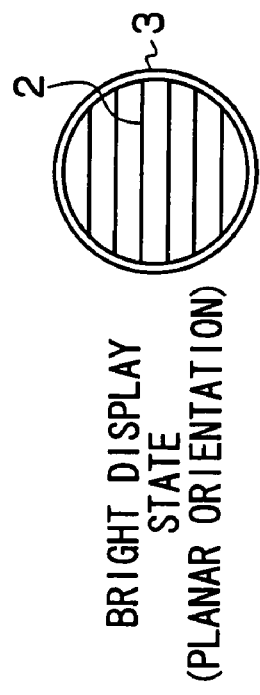
FIG. 14D
BRIGHT DISPLAY STATE (PLANAR ORIENTATION)
DARK DISPLAY STATE (FOCAL CONIC ORIENTATION)
IMMEDIATELY AFTER WRITING
HIGH TEMPERATURE STORAGE
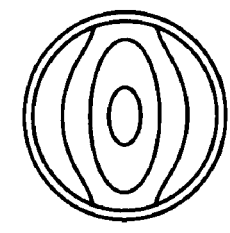
FIG. 14B
FIG. 14E
VERTICALLY ORIENTING MICROCAPSULE
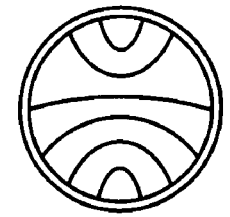
FIG. 14C
FIG. 14F
PARALLEL ORIENTING MICROCAPSULE

US 7,597,820 B2

LIQUID CRYSTAL-CONTAINING COMPOSITION, METHOD OF PRODUCING THE SAME, THE LIQUID CRYSTAL DISPLAY DEVICE INCLUDING THE SAME

CROSS-REFERENCE TO RELATED APPLICATIONS

This application is based on and claims priority under 35 USC 119 from Japanese Patent Application No. 2007-026025 filed Feb. 5, 2007.

BACKGROUND

1. Technical Field

The invention relates to a liquid crystal-containing composition used for display devices, image/information recording devices, spatial light modulators, and the like, a method for producing the same, and a crystal display device including the same.

2. Background Art

In recent years, cholesteric liquid crystal display devices are receiving much attention due to their characteristics such as retention of a display with no power, high brightness of a display by disuse of a polarizing plate, and achievement of a color display without use of a color filter.

In particular, a cholesteric liquid crystal is composed of rod-like molecules disposed spirally, and interferes with and reflects light corresponding to the spiral pitch thereof (referred to as selective reflection). Therefore, when the spiral pitch has a size corresponding to the wavelengths of red, green, and blue colors, a vivid color display is provided without a color filter.

For example, a cholesteric liquid crystal filled in a cell composed of a pair of substrates each having an electrode is known to assume two alignment states: planar (P) alignment and focal conic (F) alignment. The P alignment is a state in which the spiral axis is aligned perpendicular to the substrate surface, and causes selective reflection. The F alignment is a state in which the spiral axis is aligned in parallel with the substrate surface, and transmits light. The two alignment states are changed each other when a voltage is applied between the electrodes.

Therefore, when a light absorber, for example, a black color, is disposed on the back of the cell, a bright display giving a selective reflection color is provided under the P alignment state, and a dark display giving a black color of the light absorber is provided under the F alignment state. Of the above-described alignment states, the P and F alignment states are stably retained with no power. Utilizing the property, a memory display which retains its display with no power is realized.

Various liquid crystal display devices including a cholesteric liquid crystal are proposed in several documents.

SUMMARY

According to an aspect of the invention, there is provided a liquid crystal-containing composition composed of a cholesteric liquid crystal, a polymer, and particles having hydrophobic surfaces at the interface between a region containing the cholesteric liquid crystal and a region containing the polymer.

BRIEF DESCRIPTION OF THE DRAWINGS

Exemplary embodiments of the present invention will be described in detail based on the following figures, wherein:

FIG. 14 is a schematic view for illustrating the degradation of display quality occurring in a conventional liquid crystal-containing composition stored at high-temperatures.

DETAILED DESCRIPTION

A specifically exemplary embodiment will be described in detail below. In the present specification " . . . to . . . " represents a range including the numeral values represented before and after "to" as a minimum value and a maximum value, respectively.

A liquid crystal-containing composition according to a present exemplary embodiment is composed of a cholesteric liquid crystal, a polymer, and particles, the particles being at the interface between the region containing the cholesteric liquid crystal and the region containing the polymer to form projections, and having hydrophobic surfaces (hereinafter the particles are referred to as "hydrophobic particles").

Figure 1:
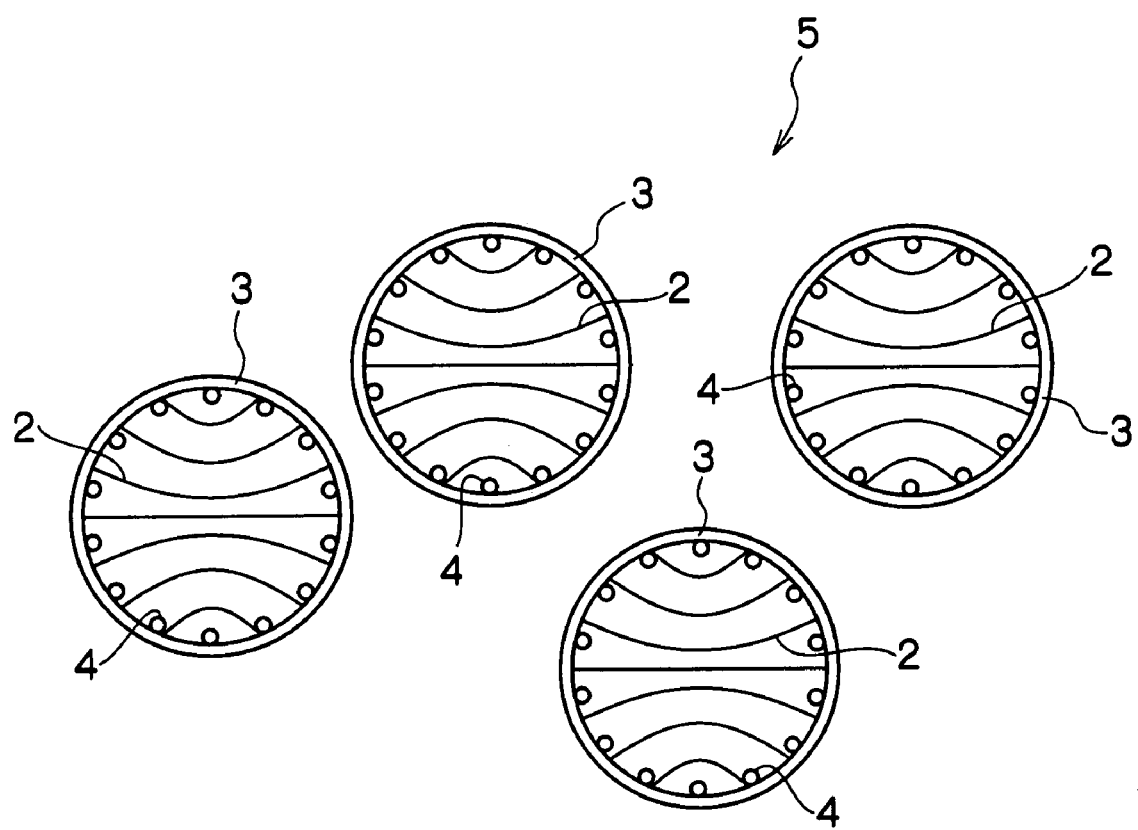
FIG. 1 is a schematic block diagram showing an example of the liquid crystal-containing composition according to an exemplary embodiment.

More specifically, a liquid crystal-containing composition 5 may be composed of, as shown in FIG. 1, a cholesteric liquid crystal 2 and microcapsules 3 enclosing the cholesteric liquid crystal 2 within a polymer wall, wherein particles 4 are at the interface between the region containing the cholesteric liquid crystal 2 and the microcapsules 3 (the interface on the side of the region containing the cholesteric liquid crystal 2) to form projections. The microcapsules 3 may be dispersed and retained in a resin member as a polymer.

Figure 2:
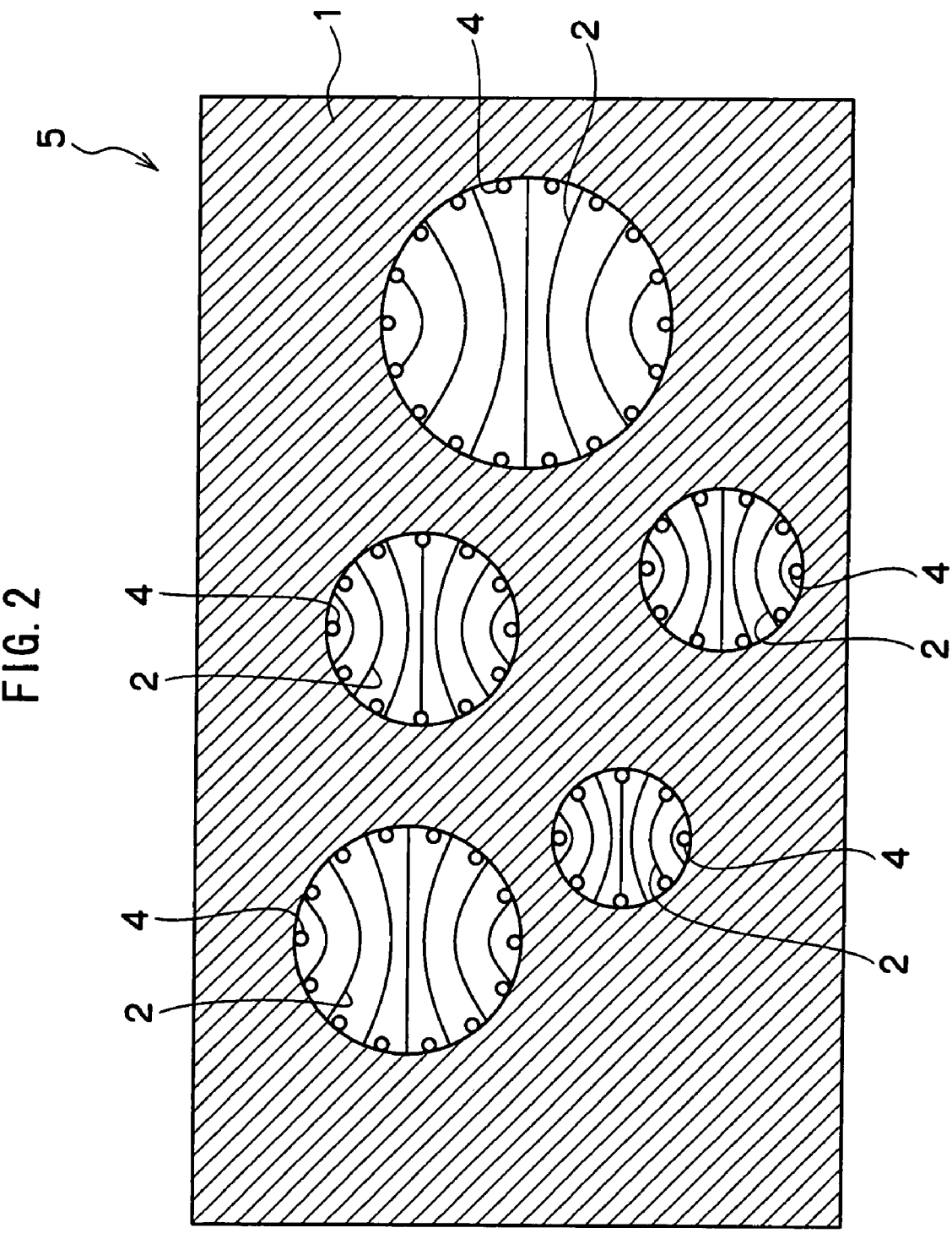
FIG. 2 is a schematic block diagram showing another example of the liquid crystal-containing composition according to an exemplary embodiment.

Alternatively, a liquid crystal-containing composition 5 is composed of, as shown in FIG. 2, a cholesteric liquid crystal 2, and a resin member 1 (polymer) in which the cholesteric liquid crystal 2 is dispersed and retained in a phase-separated state in the resin member 1, wherein particles 4 are at the interface between the region containing the cholesteric liquid crystal 2 and the resin member 1 (the interface on the side of the region containing the cholesteric liquid crystal 2) to form projections. The "phase-separated state" refers to a state in which plural substances immiscibly are in independent phases.

The particles 4 are hydrophobic particles. FIG. 1 is a schematic block diagram showing an example of the liquid crystal-containing composition according to a present exemplary embodiment. FIG. 2 is a schematic block diagram showing another example of the liquid crystal-containing composition according to a present exemplary embodiment.

If the projections are not formed, then, as shown in FIG. 14, the spiral layers of the cholesteric liquid crystal 2 are forcibly aligned by a voltage immediately after application of the voltage, so that during a bright display state they are aligned nearly horizontal to the surface of the substrate (not shown) as indicated by FIG. 14(*a*), and during a dark display state, they are aligned nearly perpendicular to the substrate surface, as indicated by FIG. 14(*d*). However, when stored at high-temperatures, the molecular motion of the liquid crystal becomes more active, and the alignment starts to change to a more stable alignment. For example, when the microcapsules 3 (shells) have a vertically alignment property that aligns the liquid crystal molecules perpendicular to the interface, the spiral layers of the cholesteric liquid crystal 2 tend to be aligned perpendicular to the interface, so that the alignment is distorted as shown by FIG. 14(*b*) and FIG. 14(*e*). On the other hand, when the microcapsules 3 (shells) have a parallel alignment property that aligns liquid crystal molecules in parallel with the interface, the spiral layers of the cholesteric liquid crystal 2 tend to be aligned in parallel with the interface, so that the alignment is distorted as shown by FIG. 14(*c*) and FIG. 14(*f*). These alignment distortions change the reflection spectra, degrading the display quality.

On the other hand, when particles 4 are at the interface with the polymer (microcapsules 3) (the interface on the side of the region containing the cholesteric liquid crystal 2), degradation in the display quality is suppressed even when stored at high-temperatures (for example, from 50° C. to the phase transition temperature of the liquid crystal). The reason for this is considered to be that the alignment is stabilized by an "alignment pinning effect" in which the projections at the interface suppress changes in the alignment state (such as a spiral alignment state) of the cholesteric liquid crystal. In particular, the content of the liquid crystal in the microcapsules 3 is limited, so that the alignment pinning effect is stably exerted on the contained liquid crystal. Accordingly, when a display device includes a composition composed of microcapsules having particles 4 attached to the inner surface thereof to form projections, the uniformity of high-temperature stability of the entire display layer is increased.

In addition, when hydrophobic particles are used as the particles 4 for attaching the particles 4 to the polymer surface, the dispersibility of the particles 4 at the polymer surface is improved, and uniform projections are formed at the interface between the cholesteric liquid crystal 2 and the microcapsule 3. Accordingly, the "alignment pinning effect" is more effectively exerted, and degradation of the display quality during high-temperature storage is more effectively suppressed.

The liquid crystal-containing composition according to a present exemplary embodiment is described below in detail. The numerals are omitted in the following description.

In the first place, the cholesteric liquid crystal is further described. A cholesteric liquid crystal is a liquid crystal material containing an optically-active compound, and is obtained by, for example, (1) a method of adding, for example, an optically-active compound referred to as a chiral dopant into a nematic liquid crystal, or (2) a method of using a liquid crystal material which itself is optically-active such as a cholesterol derivative. In the former case, examples of the nematic liquid crystal material include known nematic liquid crystal-containing compositions such as cyanobiphenyl-based, phenyl cyclohexane-based, phenyl benzoate-based, cyclohexyl benzoate-based, azo methine-based, azobenzene-based, pyrimidine-based, dioxane-based, cyclohexyl cyclohexane-based, stilbene-based, and tran-based ones. Examples of the chiral dopant include cholesterol derivatives and compounds having an optically-active group such as a 2-methylbutyl group.

The cholesteric liquid crystal may contain an additive such as a dye and particles. The cholesteric liquid crystal may be a gel prepared by using a crosslinkable polymer or hydrogen-bonding gelling agent. In addition, the cholesteric liquid crystal may be either a high, middle, or low molecular weight liquid crystal, or a mixture thereof. The spiral pitch of the cholesteric liquid crystal may be changed according to the type or addition amount of the chiral dopant, or the material of the liquid crystal. The wavelength of the selective reflection may be in the visible wavelength range, ultraviolet wavelength or infrared wavelength range. In order to acquire a memory property, the average particle diameter of the below-described cholesteric liquid crystal drops (including microcapsule) dispersed in a polymer is preferably at least three times larger than the spiral pitch of the cholesteric liquid crystal.

As an aligning agent, a vertically aligning component such as an alkyl group may be introduced at the interface between the cholesteric liquid crystal and the polymer, or into the polymer. The horizontally alignment property intrinsic to the polymer is canceled by the vertically alignment property of the introduced vertically aligning component to weaken the force controlling the alignment. As a result, the cholesteric liquid crystal layers are straightened to have no curvature, which results in the improvement in the color purity and display contrast. The alignment control force is so weak that there are hardly any variations in the energy of the liquid crystal molecules in contact with the polymer regardless of the alignments. Therefore, both the P and F alignments are stable over time. Details about the vertically aligning component are as described in JP-A No. 2005-316243.

The following section describes the hydrophobic particles disposed at the interface between the region containing the cholesteric liquid crystal and the region containing the polymer to form projections.

The hydrophobic particles have hydrophobic surfaces. Example of the hydrophobic particles include organic particles and inorganic particles.

Examples of the organic particles include polyurethane resin particles, acrylic resin particles, methacrylic resin particles, epoxy resin particles, polystyrene resin particles, synthetic rubber particles, melamine particles, and benzoguanamine particles. These resins are preferably crosslinked so as not to be dissolved in the liquid crystal.

Examples of the inorganic particles include: metal oxide particles such as silica ($SiO_2$), alumina ($Al_2O_3$), titanium oxide ($TiO_2$), zinc oxide (ZnO), tin oxide ($SnO_2$), antimony oxide ($SbO_2$), zirconium oxide ($ZrO_2$), cerium oxide ($CeO_2$), barium titanate ($BaTiO_3$), and strontium titanate ($SrTiO_3$); metal colloids such as a gold colloid and a silver colloid; metal sulfide particles such as zinc sulfide particles; and metal selenium particles such as selenium sulfide particles. Among them, metal oxide particles are preferable, because they are colorless and transparent, and more stable than other particles from the thermal, electrical, and chemical viewpoints.

The above-described particles are subjected to, for example, hydrophobization treatment to have hydrophobic surfaces. Examples of the hydrophobing agent for the hydrophobization treatment include silane compounds such as a silane coupling agent and a silicone oil. The silane coupling agent may be alkoxysilane, chlorosilane, silazane, or a special silylating agent. Specific examples thereof include tetramethoxysilane, tetraethoxysilane, methyltrimethoxysilane, dimethyldimethoxysilane, phenyltrimethoxysilane, diphenyldimethoxysilane, tetraethoxysilane, methyltriethoxysilane, dimethyldiethoxysilane, phenyltriethoxysilane, diphenyldiethoxysilane, isobutyltriethoxy silane, decyltrimethoxysilane, hexamethyldisilazane, methyltrichlorosilane, dimethyldichlorosilane, trimethylchlorosilane, phenyltrichlorosilane, diphenyldichlorosilane, N,O-(bistrimethylsilyl)acetamide, N,N-(trimethylsilyl)urea, tert-butyldimethylchlorosilane, vinyltrichlorosilane, vinyltrimethoxysilane, vinyltriethoxysilane, γ-methacryloxypropyltrimethoxysilane, β-(3,4-epoxycyclohexyl)ethyltrimethoxysilane, γ-glycidoxypropyltrimethoxysilane, γ-glycidoxypropylmethyl diethoxysilane, γ-mercaptopropyltrimethoxysilane, and γ-chloropropyltrimethoxysilane. Among them, alkyl compounds and a silicone oil are preferable.

The alkyl group of the alkyl compound preferably has one or more carbon atoms, and more preferably 4 or more carbon atoms. The upper limit of carbon atoms is preferably 18 or less from the viewpoint of availability.

More specifically, the surface of the hydrophobic particles is preferably modified with, for example, an alkyl group having one or more carbon atoms, specifically 4 or more carbon atoms. The surface of the hydrophobic particles is preferably modified with, for example, a silicone oil. The surface modification of the particle with a silicon oil may be conducted through formation of a chemical bond on the particle surfaces, or adhesion to the particle surface with no reaction.

Specific examples of the alkyl compound include alkylalkoxidesilane (for example, methyltriethoxysilane, dimethyldimethoxysilane, isopropyltrimethoxysilane, hexyltriethoxysilane, octyltriethoxysilane, decyltriethoxysilane, dodecyltriethoxysilane, and octadecyltriethoxy silane), alkylchlorosilane (for example, methyltrichlorosilane, dimethyldichlorosilane, trimethylchlorosilane, and octyldimethylchlorosilane), and silazane compounds (for example, hexamethyldisilazane). Through the treatment using the alkyl compound, the particle surfaces are modified by alkyl groups (alkyl chains) to have hydrophobicity.

The number average molecular weight of the silicone oil is not particularly limited, but preferably from about 1,000 to about 100,000.

Examples of the silicone oil include straight silicone oil and modified silicone oil. Examples of the straight silicone oil include dimethyl silicone oil and methylphenyl silicone oil. Examples of the modified silicone oil include fluorine-modified silicone oil, alkyl-modified silicone oil, amino-modified silicone oil, and epoxy-modified silicone oil.

The amount to be treated by the hydrophobing agent is preferably from about 0.1 parts by mass to about 80 parts by mass, and more preferably from about 1 parts by mass to about 50 parts by mass with respect to 100 parts by mass of particles.

Examples of the method of hydrophobization treatment with a hydrophobing agent include hydrophobization in a water-based medium, an organic solvent, or a vapor phase.

For example, hydrophobization in a water-based medium is conducted by dispersing particles as primary particles, and then adding a hydrophobing agent thereto. More specifically, for example, in cases where alkylsilane is used as the hydrophobing agent, hydrophobization is conducted while alkylsilane is hydrolyzed thereof. Alternatively, for example, in cases where a silicone oil is used as the hydrophobing agent, hydrophobization is conducted using an emulsion formed thereof. In this case, for example, produced particles are dispersed in the water-based medium in the form of a water-based paste without undergoing a drying step, and dispersed as primary particles. In cases where a plural hydrophobing agents are used, they may be added simultaneously or successively.

Examples of the method of hydrophobization in a gas phase include a method of dripping or spraying a hydrophobing agent over particles while stirred mechanically or by airflow. In this case, the reaction vessel is preferably purge with nitrogen, or heated to a temperature of, for example, 50° C. to 350° C. The hydrophobing agent may be diluted with a solvent such as alcohol, ketone, or carbohydrate before use. Further, in order to enhance reactivity during hydrophobization, ammonia, amine, alcohol, or water may be added.

Another example of the gas phase process is a method of forming particles in a carrier gas by a gas process (for example, a chlorine method or low temperature oxidation method), and then treating the particles in the gas phase with a vaporized or atomized hydrophobing agent (or solvent-diluted hydrophobing agent). In cases where a plural hydrophobing agents are used, they may be added simultaneously or successively.

Hydrophobization in an organic solvent is conducted by, for example, dispersing particles in an organic solvent, treating the particles with a hydrophobing agent, separating the particles by filtration or evaporating the solvent, and then drying the particles. The drying step may be followed by cracking treatment using a pin-type mill or jet mill to reduce aggregates. The drying step may be ventilation drying or fluidized drying, and preferably conducted by heating, for example, to a temperature of about from 50° C. to 350° C., under reduced pressure optionally. Preferable examples of the organic solvent include carbohydrate-based organic solvents such as toluene, xylene, hexane, and ISOPAR (registered trade name) (Exon Co., Ltd). Examples of the device for dispersion treatment include a stirrer, a shaker, a mill, a mixer, and a disperser. Among them, a disperser using media such as balls or beads of ceramic, agate, alumina, or zirconia is preferable. Examples thereof include a sand mill, a grain mill, a basket mill, a ball mill, a sand grinder, a visco mill, a paint shaker, an attritor, a dynomill, and a pearl mill.

The average particle diameter of the particles is preferably in a range of from about 0.1 to about 5 times, and more preferably from about 0.2 to about 2 times the spiral pitch of the cholesteric liquid crystal. For example, for a cholesteric liquid crystal which has a spiral pitch of 400 nm to reflect a red color, the average particle diameter is preferably from about 40 nm to about 2 µm or less, and more preferably from about 80 nm to about 800 nm.

The addition of the particles preferably provides a particle density of from about 0.3 particles/µm$^2$ to about 20 particles/

μm², and more preferably from about 0.5 particles/μm² to about 5 particles/μm² or less at the above-described interface.

The average particle diameter and particle density are measured as follows. The coating film of the liquid crystal-containing composition is cut with a sharp cutter, and the cut surface is washed with alcohol, dried, and then coated with gold by vapor deposition. The sample thus obtained is observed with a scanning electron microscope (trade name: S-4500, manufactured by Hitachi, Ltd.) to measure the diameter of the particles being at the interface between the region containing the cholesteric liquid crystal and the region containing the polymer, from which the surface density is calculated.

Examples of the method for manufacturing the liquid crystal-containing composition according to a present exemplary embodiment include: (1) a microcapsulation method using the cholesteric liquid crystal as core and a polymer as wall; (2) a dispersion drying method in which a cholesteric liquid crystal is dispersed in a polymer (resin member) solution which is immiscible with the cholesteric liquid crystal, such as polyvinyl alcohol, and then the solvent is dried; (3) a phase separation method in which the cholesteric liquid crystal is dissolved in a polymer or monomer units thereof using heat or a solvent, and then the mixture is subjected to external stimuli such as heat or light to cause phase separation into a cholesteric liquid crystal and a polymer (resin member); and (4) an impregnation method of impregnating the cholesteric liquid crystal into a previously prepared macromolecular network structure.

Examples of the phase separation method of (3) include: 1) a solvent-phase separation method in which a cholesteric liquid crystal is dissolved together with a polymer in a cosolvent, and then the solvent is evaporated by decompression or heating to cause phase separation; 2) a polymerization phase separation method in which a monomer or oligomer is dissolved together with a cholesteric liquid crystal, and then crosslinked by exposure to heat, light, or electron beams to deteriorate the compatibility thereby causing phase separation; and 3) a heat phase separation method in which a cholesteric liquid crystal is dissolved in a polymer by heating, and then the mixture is cooled to cause phase separation.

These methods are further described below.

(1) Microcapsulation Method

Examples of the method for preparing microcapsules include: 1) a phase separation method in which a liquid crystal is dispersed in a polymer solution, and then the solution is subjected to phase separation to form a film on the surfaces of liquid crystal drops; 2) a in-liquid drying method in which a polymer and a liquid crystal are dissolved in a cosolvent, the solution is dispersed in an aqueous phase, and the solvent is evaporated; 3) an interfacial polymerization method in which a mixed solution (oil phase solution) of a liquid crystal and an oil-soluble monomer A is dispersed in an aqueous phase, to which a water-soluble monomer B is added to react with the monomer A through interfacial polymerization thereby forming a film; 4) an in situ polymerization method in which a monomer is dissolved in a liquid crystal or an aqueous phase, and polymerized by heating or the like to form a film through deposition of a polymer.

—Phase Separation Method—

Examples of the phase separation method include: a complex coacervation method in which an aqueous polymer solution containing two water-soluble polymers (for example, gelatin and gum arabic, protein and polysaccharide, protein and protein, protein and nucleic acid, or a polysaccharide and nucleic acid) is separated into a dense phase and a dilute phase by controlling the pH or temperature; and a simple coacervation method in which a water-miscible organic solvent (for example, alcohol or acetone) is added into a solution of a water-soluble polymer such as polyvinyl alcohol, gelatin, or alkyl cellulose, and then subjected to phase separation.

—In-liquid Drying Method—

The in-liquid drying method is conducted, for example, by dissolving a polymer together with a liquid crystal in a low boiling point solvent, dispersing the solution in an aqueous phase, and then evaporating the solvent by decompression or heating. Examples of the combination of a polymer and a solvent include a fluorine-containing resin and a fluorine-based solvent such as a chlorofluorocarbon, or a methylene chloride and an acrylic resin, urethane resin, or polyester resin having an alkyl group or halogenated alkyl group.

—Interfacial Polymerization Method—

In the interfacial polymerization method, examples of the oil-soluble monomer A include polyvalent compounds having a plural functional groups such as basic acid halide, haloformate, isocyanate, isothiocyanate, ketene, carbodiimide, epoxy, glycidyl ether, oxazoline, ethylene imine, or lactone, and examples of the water-soluble monomer B include polyvalent compounds having a plural functional groups such as amine, alcohol, carboxylic acid, mercaptan, or phenol.

—In Situ Polymerization Method—

Examples of the in situ polymerization method include: 1) a method of polymerizing an oil-soluble monomer A and monomer C; and 2) a method of using a monomer D such as a radical polymerizable monomer which is polymerizable per se. Under the method of 1), the monomer A may include the same as the monomer A described in the section of the interfacial polymerization method, and examples thereof include polyvalent compounds having within one molecule thereof a plural functional groups such as basic acid halide, haloformate, isocyanate, isothiocyanate, ketene, carbodiimide, epoxy, glycidyl ether, oxazoline, ethylene imine, or lactone. Examples of the monomer C include polyvalent compounds having within one molecule thereof a plural functional groups such as amine, alcohol, carboxylic acid, mercaptan, or phenol. Under the method of 2), examples of the monomer D include polyvalent epoxy compounds, polyvalent isocyanate compounds, and unsaturated carbohydrate compounds such as styrene, isoprene, butadiene, vinyl chloride, vinylidene chloride, acrylonitrile, acrylic acid derivatives, and methacrylic acid derivatives. Further, a wall material may be formed in the aqueous phase from a water-soluble monomer such as melamine or formaldehyde.

(2) Dispersion Drying Method

The polymer used for the dispersion drying method is a water-soluble polymer which is sparingly miscible and swollen with the cholesteric liquid crystal, and examples thereof include polyvinyl alcohol, alkyl cellulose, and gelatin. Under the method, a liquid crystal-containing composition is obtained by dispersing the cholesteric liquid crystal in the aqueous solution of the water-soluble polymer, applying the dispersion onto a substrate, and then drying water.

(3) Phase Separation Method

—Solvent Phase Separation Method—

Under the solvent phase separation method, a liquid crystal-containing composition is obtained by applying a solution dissolving a polymer and a liquid crystal in a cosolvent onto a substrate, and then evaporating the solvent. The method usually uses the same polymer and solvent as that used for preparing microcapsules by the in-liquid drying method. However, since the drying step under the method is conducted in a vapor phase, the solvent may evaporate too fast and the resultant particle diameter may be too small. Therefore, the solvent may have a higher boiling point and a lower vapor pressure than that used in the in-liquid drying method.

—Polymerization Phase Separation Method—

The polymerization phase separation method uses the same monomer as that used for preparing microcapsules by the in situ polymerization method. Specifically, a solution dissolving a monomer and a liquid crystal is applied onto a substrate or injected into a cell, and then polymerized to cause phase separation.

—Heat Phase Separation Method—

The heat phase separation method is conducted by, for example, 1) adding to a melt of a polymer and a liquid crystal, or 2) melting and mixing a polymer and a liquid crystal. In the case of 1), examples of the polymer include thermoplastic resins such as a polyvinyl butyral, an ethylene-vinyl acetate copolymer, an ethylene-vinyl chloride copolymer, a vinyl chloride-vinyl acetate copolymer, polyester, and derivatives thereof. In the case of 2), the same polymer as 1) is used.

(4) Impregnation Method

Under the impregnation method, for example, particles of a fluorine-containing resin or a silicone resin are fused to form a porous material.

Under the above-described methods, the polymer is preferably a polymer which is sparingly soluble in a liquid crystal (for example, a water-soluble resin, fluorine-containing resin, or silicone resin), or a crosslinked polymer in order to prevent swelling or dissolving in a liquid crystal.

As described above, the liquid crystal-containing composition according to a present exemplary embodiment may be made by various methods. In particular, the microcapsulated liquid crystal-containing composition has wide applications owing to its characteristics such as that it may be appliable to various surfaces since it is dispersed in a binder material, another functional layer may be provided on the liquid crystal-containing composition since the liquid crystal is protected by a wall material, and the composition has excellent mechanical strength such as pressure and bending strength.

Under the above-described methods, formation of the projections by particles is achieved by disposing the particles at the interface between the cholesteric liquid crystal and a polymer by adding the particles into: 1) the cholesteric liquid crystal; 2) a polymer to be mixed with the cholesteric liquid crystal, or a precursor thereof such as a monomer or oligomer; 3) a mixed solution of the cholesteric liquid crystal and a polymer or precursor thereof such as a monomer or oligomer; or 4) a mixed solution of the cholesteric liquid crystal, a polymer or precursor thereof such as a monomer or oligomer, and an organic solvent as a dissolving aid. Further, through the use of hydrophobic particles, uniform projections are more readily formed at the interface between the cholesteric liquid crystal and the polymer.

The liquid crystal-containing composition according to a present exemplary embodiment is applied onto a substrate by a printing method such as a screen printing, a letterpress printing, a plate printing, a lithography, or a flexographic printing, or a coating method such as a spin coating, a bar coating, a dip-coating, a roll coating, a knife coating, or a die coating.

The liquid crystal-containing composition according to a present exemplary embodiment is used for, for example, a display device, an image/information recording device, or a spatial light modulator. In particular, the composition is preferably used for a display device, more specifically a liquid crystal display device. The liquid crystal display device according to a present exemplary embodiment is further described below.

Figure 3:
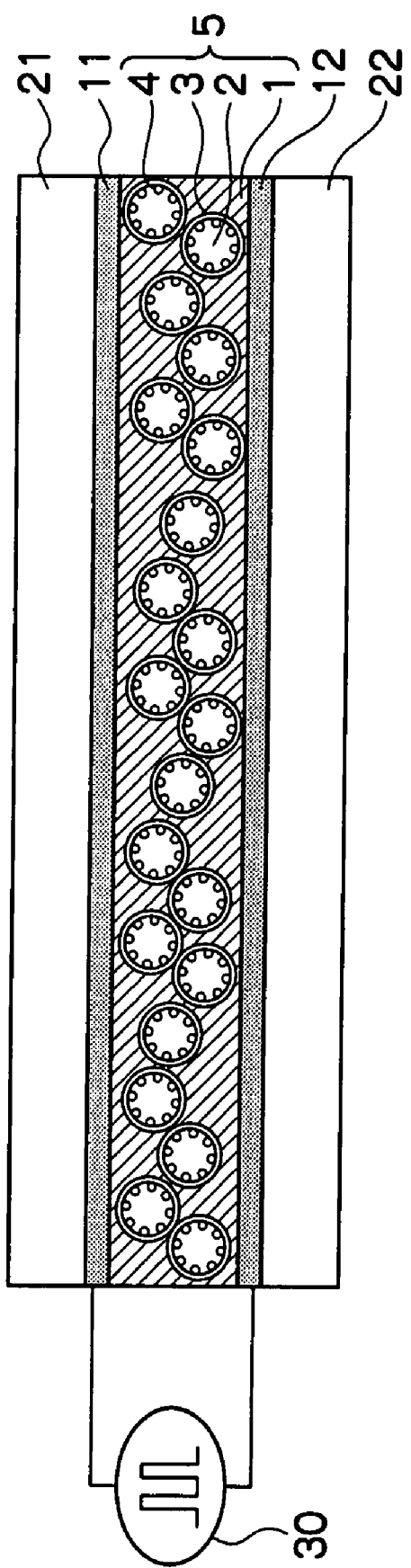
FIG. 3 is a schematic block diagram showing an example of the liquid crystal display device according to an exemplary embodiment.

The liquid crystal display device according to a present exemplary embodiment is composed of the liquid crystal-containing composition according to a present exemplary embodiment sandwiched between a pair of electrodes. More specifically, for example, as shown in FIG. 3, a liquid crystal-containing composition 5 is sandwiched between substrates 21 and 22 having an electrode 11 and 12, respectively, to which voltage pulses are applied by a driving circuit 30 to provide a display. As a display background, a light absorption member may be provided between the liquid crystal-containing composition 5 and the electrode 12, or on the back of the substrate 22. Examples of the material of the substrates 21 and 22 include glass and a resin (a transparent dielectric material such as polyethylene terephthalate, polyether sulfone, polycarbonate, or polyolefin). Examples of the material of the electrodes 11 and 12 include a transparent conductive film such as an indium oxide tin alloy or zinc oxide.

Figure 4:
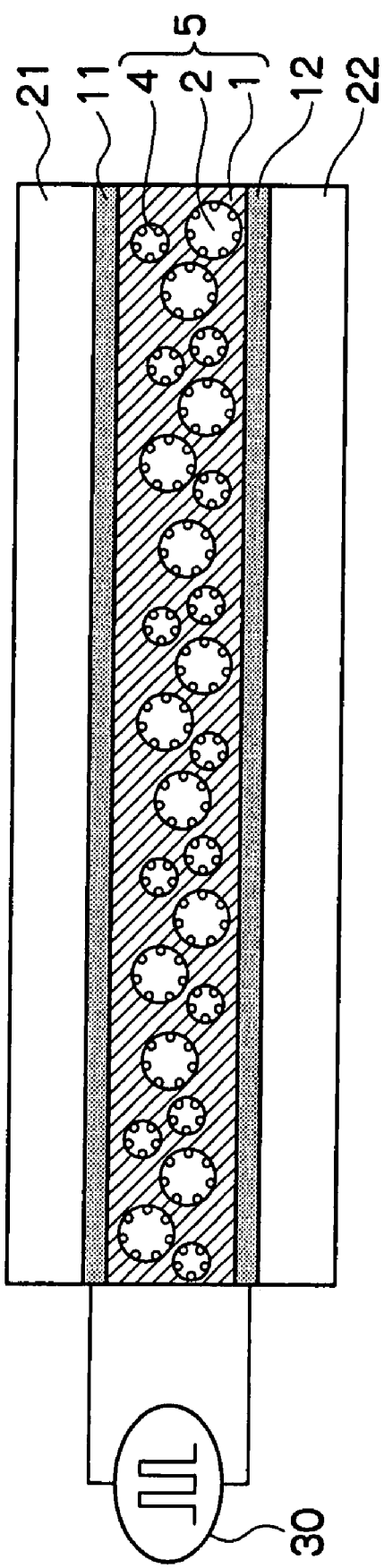
FIG. 4 is a schematic block diagram showing another example of the liquid crystal display device according to an exemplary embodiment.

In the liquid crystal display device shown in FIG. 3, as the liquid crystal-containing composition 5, microcapsules 3 containing a cholesteric liquid crystal 2 therein are dispersed and retained in a resin member 1, and particles 4 are at the interface between the cholesteric liquid crystal 2 and the microcapsule 3 to form projections. The composition is not limited to the above-described structure, and may have a structure as shown in FIG. 4, in which, as the liquid crystal-containing composition 5, a cholesteric liquid crystal 2 is dispersed and retained in a phase-separated state in a resin member 1, and particles 4 are at the interface between the cholesteric liquid crystal 2 and the resin member 1 to form projections.

In the liquid crystal display device according to a present exemplary embodiment, the liquid crystal-containing composition according to a present exemplary embodiment is adapted to emphasize the optical difference between the P alignment and F alignment in the memory state of the cholesteric liquid crystal. Therefore, the display mode may adopt, in addition to the above-described selective reflection mode, a scattering-transmission mode using the difference in the light scattering strengths of the P alignment and F alignment, an optical rotatory mode using the difference in the optical rotation, or a birefringence mode using the difference in birefringence. In this case, a polarizing plate or a retardation film may be used as a auxiliary member. Further, the liquid crystal may contain a dichroic dye to provide a display in a guest-host mode.

The liquid crystal display device according to a present exemplary embodiment is driven by a known driving method, such as: 1) a segment driving method of driving the device sandwiched between electrodes which have been patterned on the display form; 2) a simple matrix driving method in which the liquid crystal-containing composition is sandwiched between a pair of intersecting (for example at right angles) stripe electrode substrates, successively scanned line by line to form an image, 3) an active matrix driving method in which driving is conducted through an active device, such as a thin-film transistor, thin film diode, or MIM (metal-insulator-metal) device, provided on each pixel; 4) an optical driving method in which the liquid crystal-containing composition stacked on a photoconductor is sandwiched between a pair of electrodes, to which a voltage is applied while a light image is projected thereon to write an image; 5) a heat driving method in which a voltage is applied to the liquid crystal-containing composition sandwiched between a pair of electrodes to effect a transition to the P alignment, subsequently the composition is heated to a temperature higher than the phase transition temperature by using a laser or thermal to write an image; and 6) an electrostatic driving method in which the liquid crystal-containing composition is applied onto an electrode substrate, on which an image is written using a stylus head or ion head.

EXAMPLES

The present invention is further illustrated with reference to, but not limited to, the following Examples. Unless otherwise specified, "part" means "parts by mass".

Example 0

86.25 parts of a nematic liquid crystal E7 (manufactured by Merck Ltd.) are mixed with 11.0 parts of a chiral dopant R811 (manufactured by Merck Ltd.) and 2.75 parts of a chiral dopant R1011 (manufactured by Merck Ltd.) to provide 100 parts of a cholesteric liquid crystal which selectively reflects light having a wavelength of 650 nm. The cholesteric liquid crystal thus obtained is dissolved in 1000 parts of ethyl acetate together with 10 parts of TAKENATE D-110N (manufactured by Takeda Pharmaceutical Company Limited) as a polyvalent isocyanate, 3 parts of octadecanol (manufactured by Aldrich) as a precursor of a vertically aligning component, and 2 parts of hydrophobized silica particles (prepared by adding 0.1 parts of octyltriethoxysilane into 1 part of silica particles having an average particle diameter of 120 nm made from tetraethoxysilane by a sol-gel method, followed by hydrophobization according to the reference 1, "Preparation of monodisperse silica particles: control of size and mass fraction", G. H. Bogush, M. A. Tracy and C. F. Zouski IV, J. Non-Crystal. Solids, 104, 95-106 (1988).) to prepare an oil phase composition. The composition is added into 10,000 parts of a 1% polyvinyl alcohol aqueous solution, and stirred and dispersed with a mixer to make an o/w emulsion having a volume average particle diameter of 7 μm.

To the emulsion 100 parts of a 10% polyallylamine aqueous solution (manufactured by Nitto Boseki Co., Ltd.) are added, and heated at 70° C. for 2 hours to make microcapsules walled with polyurea. The microcapsules are collected by centrifugation, and mixed with a polyvinyl alcohol aqueous solution to make a microcapsule liquid crystal paint.

Thereafter, the microcapsule liquid crystal paint is applied onto a commercially available ITO-coated PET resin film by using an applicator so as to give a dry film thickness of 30 μm. On the coating, a dispersion of carbon black in a polyvinyl alcohol aqueous solution is applied so as to give a dry film thickness of 3 μm to make a light absorption layer. Aside from this, a two-package urethane-based adhesive is applied onto another ITO-coated PET resin film so as to give a dry film thickness of 3 μm. The film is bonded to the substrate coated with the microcapsule liquid crystal paint to make a liquid crystal display device.

Figure 5:
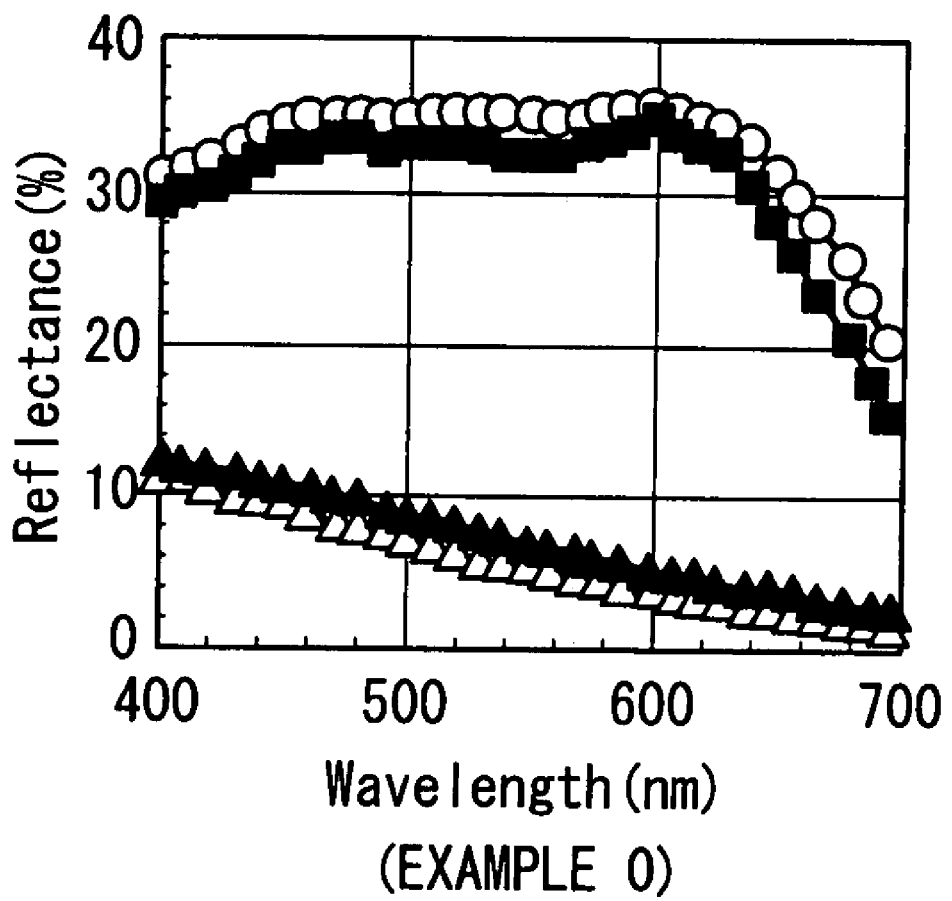
FIG. 5 shows reflection spectra of the liquid crystal display device obtained in Example 0 in the bright and dark display states.
Figure 6:
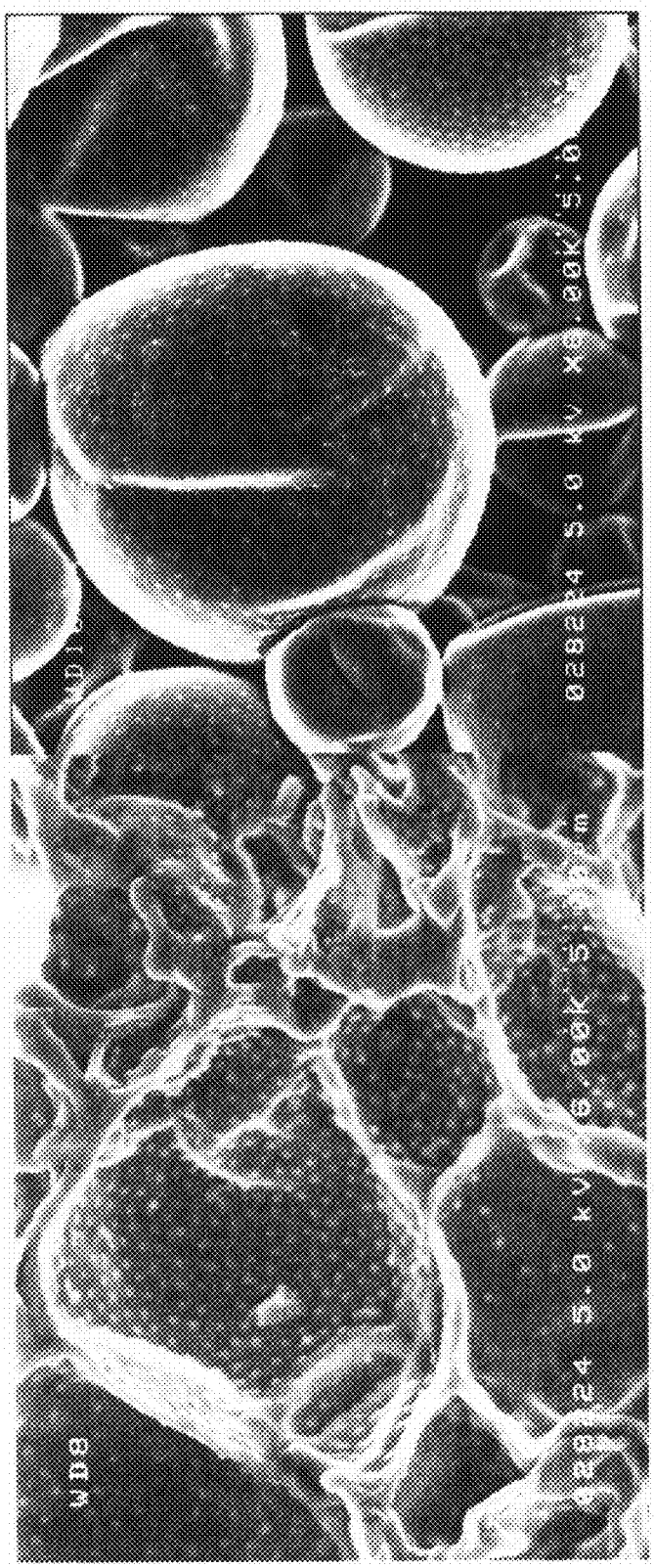
FIG. 6 shows SEM photomicrographs of the liquid crystal-containing composition in the liquid crystal display device obtained in Example 0.

The reflection spectra of the liquid crystal display device in bright and dark display states are measured immediately after preparation of the device and after storage at 55° C. for 1 hour. The results are shown in FIG. 5. The SEM photomicrographs of the liquid crystal-containing composition in the liquid crystal display device are shown in FIG. 6. The SEM photomicrographs show the inside (FIG. 6(A)) and outside (FIG. 6(B)) of the capsules.

Example 1

A liquid crystal display device is made in the same manner as Example 0, except that the hydrophobized silica particles are prepared by adding 0.1 parts of octylhexamethyldisilazane to 1 part of silica particles (average particle diameter: 120 nm) prepared by a sol-gel method, followed by hydrophobization.

Figure 7:
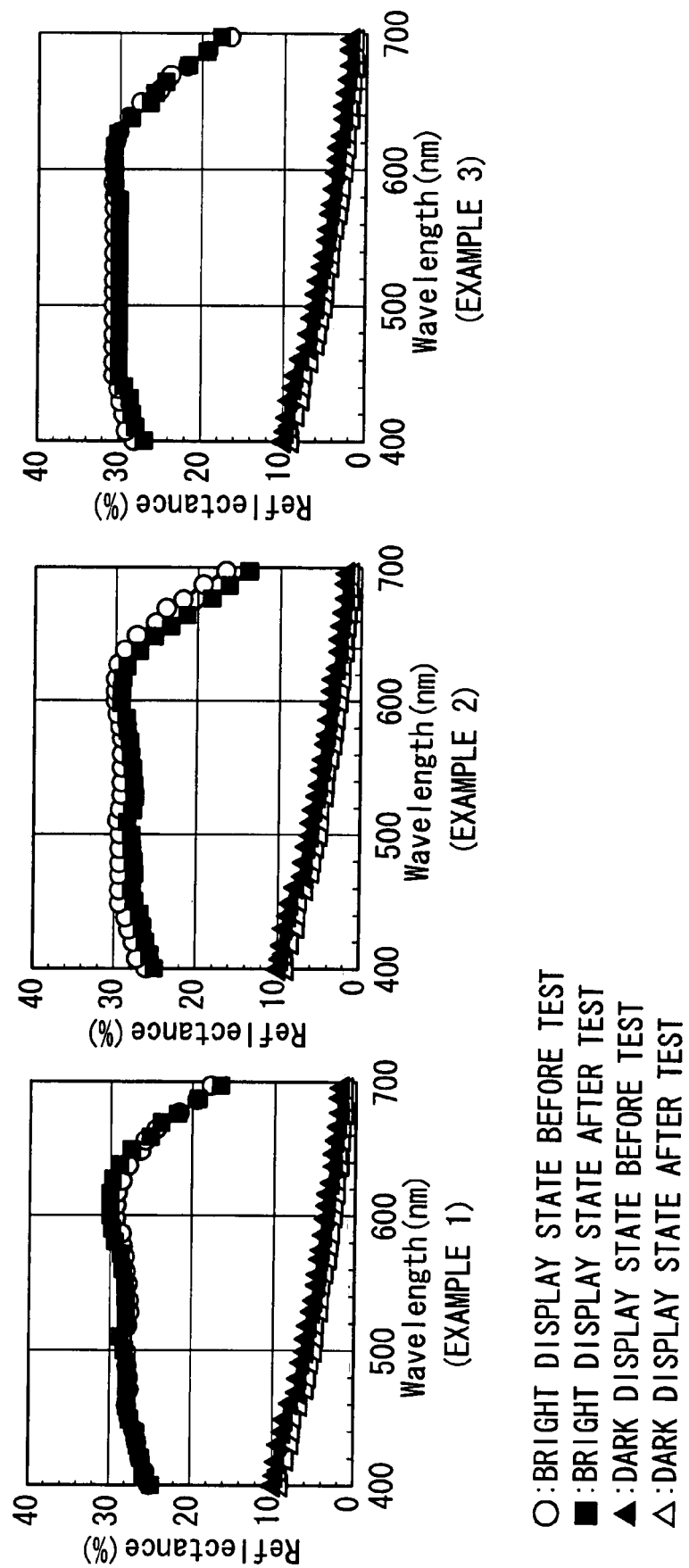
FIG. 7 shows reflection spectra of the liquid crystal display devices obtained in Examples 1 to 3 in the bright and dark display states.
Figure 8:
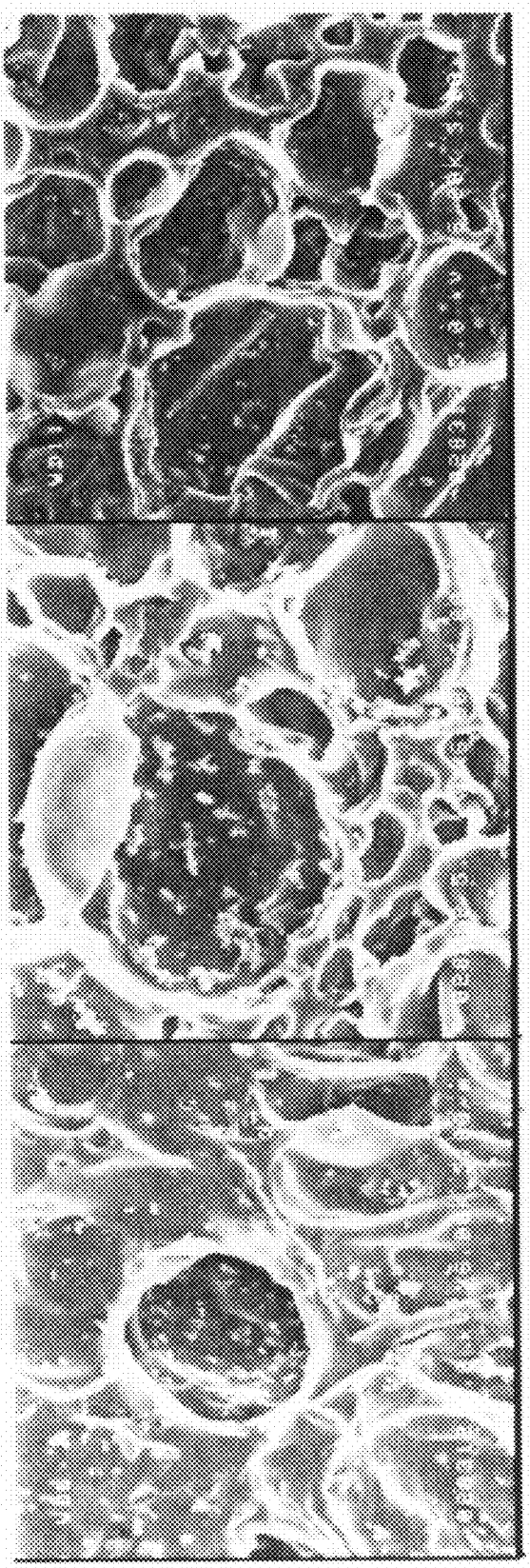
FIG. 8 shows SEM photomicrographs of the liquid crystal-containing compositions in the liquid crystal display devices obtained in Examples 1 to 3.

The reflection spectra of the liquid crystal display device in bright and dark display states are measured immediately after preparation of the device and after storage at 55° C. for 1 hour. The results are shown in FIG. 7. The SEM photomicrograph of the liquid crystal-containing composition (inside of capsules) in the liquid crystal display device is shown in FIG. 8.

Example 2

A liquid crystal display device is made in the same manner as Example 1, except that the hydrophobized silica particles are prepared by adding 0.1 parts of hexyltrimethoxysilane to 1 part of silica particles (average particle diameter: 120 nm) prepared by a sol-gel method, followed by hydrophobization.

The reflection spectra of the liquid crystal display device in bright and dark display states are measured immediately after preparation of the device and after storage at 55° C. for 1 hour. The results are shown in FIG. 7. The SEM photomicrograph of the liquid crystal-containing composition (inside of capsules) in the liquid crystal display device is shown in FIG. 8.

Example 3

A liquid crystal display device is made in the same manner as Example 0, except that the hydrophobized silica particles are prepared by adding 0.1 parts of decyltrimethoxysilane to 1 part of silica particles (average particle diameter: 120 nm) prepared by a sol-gel method, followed by hydrophobization.

The reflection spectra of the liquid crystal display device in bright and dark display states are measured immediately after preparation of the device and after storage at 55° C. for 1 hour. The results are shown in FIG. 7. The SEM photomicrograph of the liquid crystal-containing composition (inside of capsules) in the liquid crystal display device is shown in FIG. 8.

Example 4

A liquid crystal display device is made in the same manner as Example 0, except that the hydrophobized silica particles are prepared by adding 0.1 parts of dimethylsilicone oil (trade name: KF-96, manufactured by Shin-Etsu Chemical Co., Ltd.) to 1 part of silica particles (average particle diameter: 120 nm) prepared by a sol-gel method, followed by hydrophobization.

Figure 9:
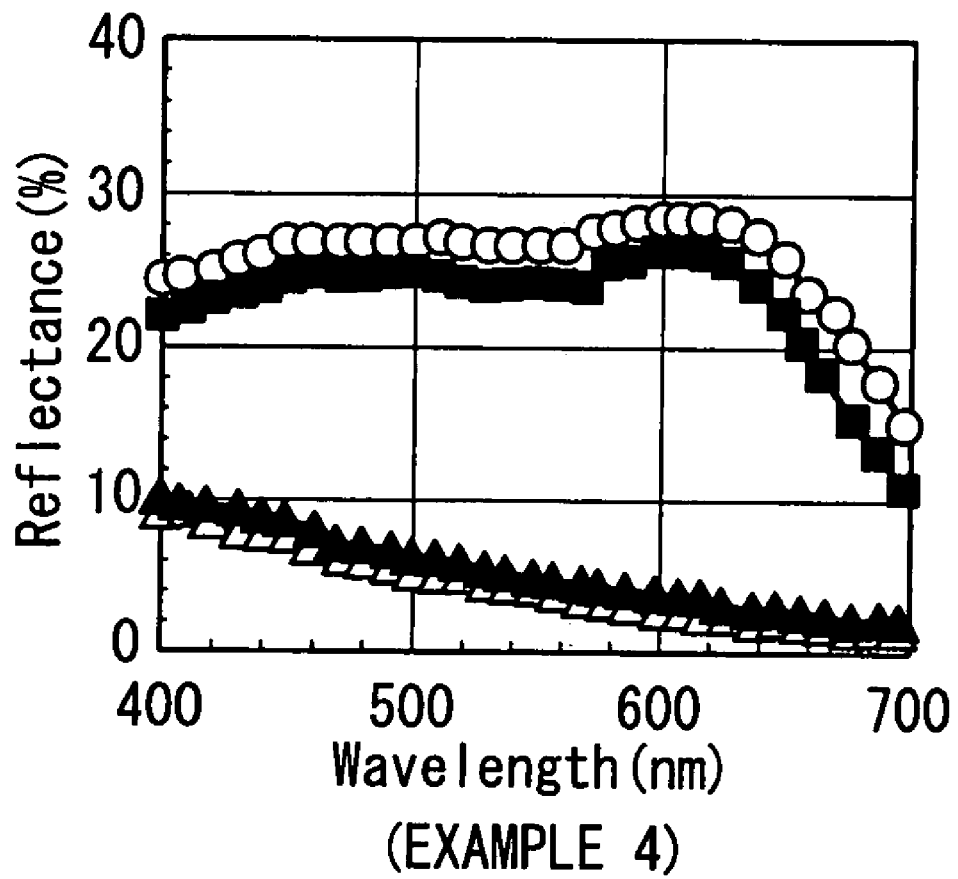
FIG. 9 shows reflection spectra of the liquid crystal display device obtained in Example 4 in the bright and dark display states.
Figure 10:
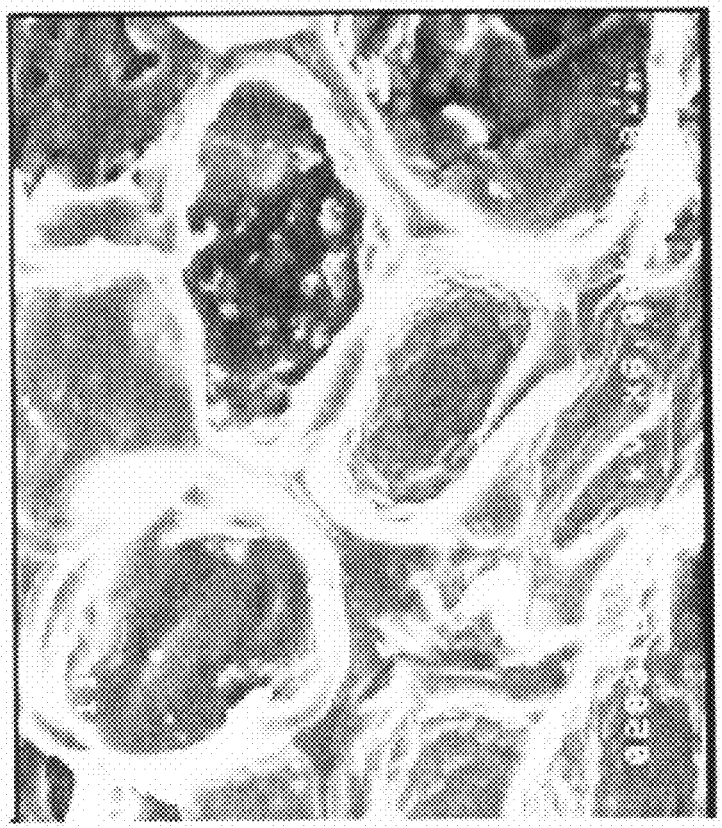
FIG. 10 shows a SEM photomicrograph of the liquid crystal-containing composition in the liquid crystal display device obtained in Example 4.

The reflection spectra of the liquid crystal display device in bright and dark display states are measured immediately after preparation of the device and after storage at 55° C. for 1 hour. The results are shown in FIG. 9. The SEM photomicrograph of the liquid crystal-containing composition (inside of capsules) in the liquid crystal display device is shown in FIG. 10.

Comparative Example 1

A liquid crystal display device is made in the same manner as Example 0, except that particles are not added upon the preparation of the oil phase composition.

Figure 11:
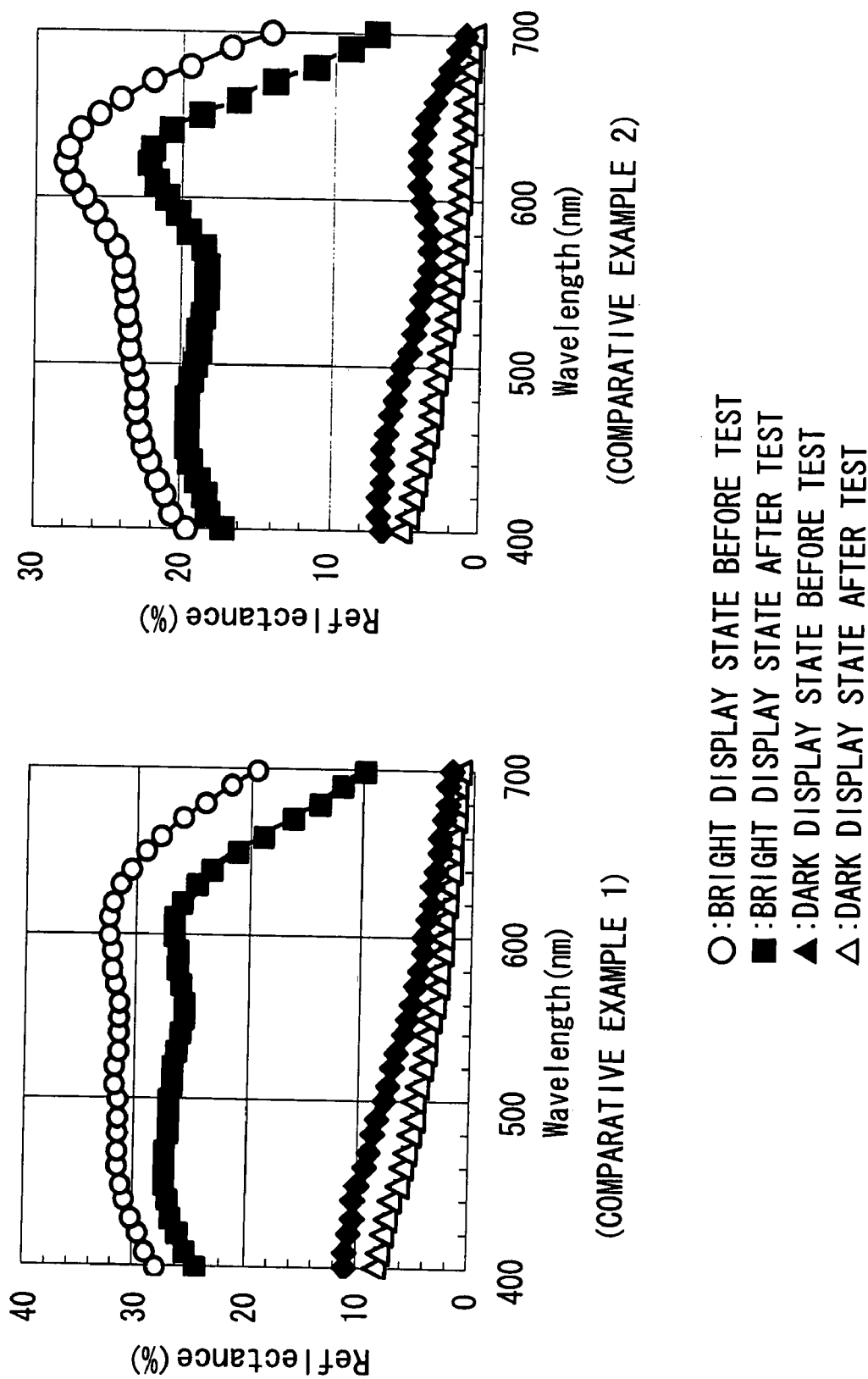
FIG. 11 shows reflection spectra of the liquid crystal display devices obtained in Comparative Examples 1 and 2 in the bright and dark display states.
Figure 12:
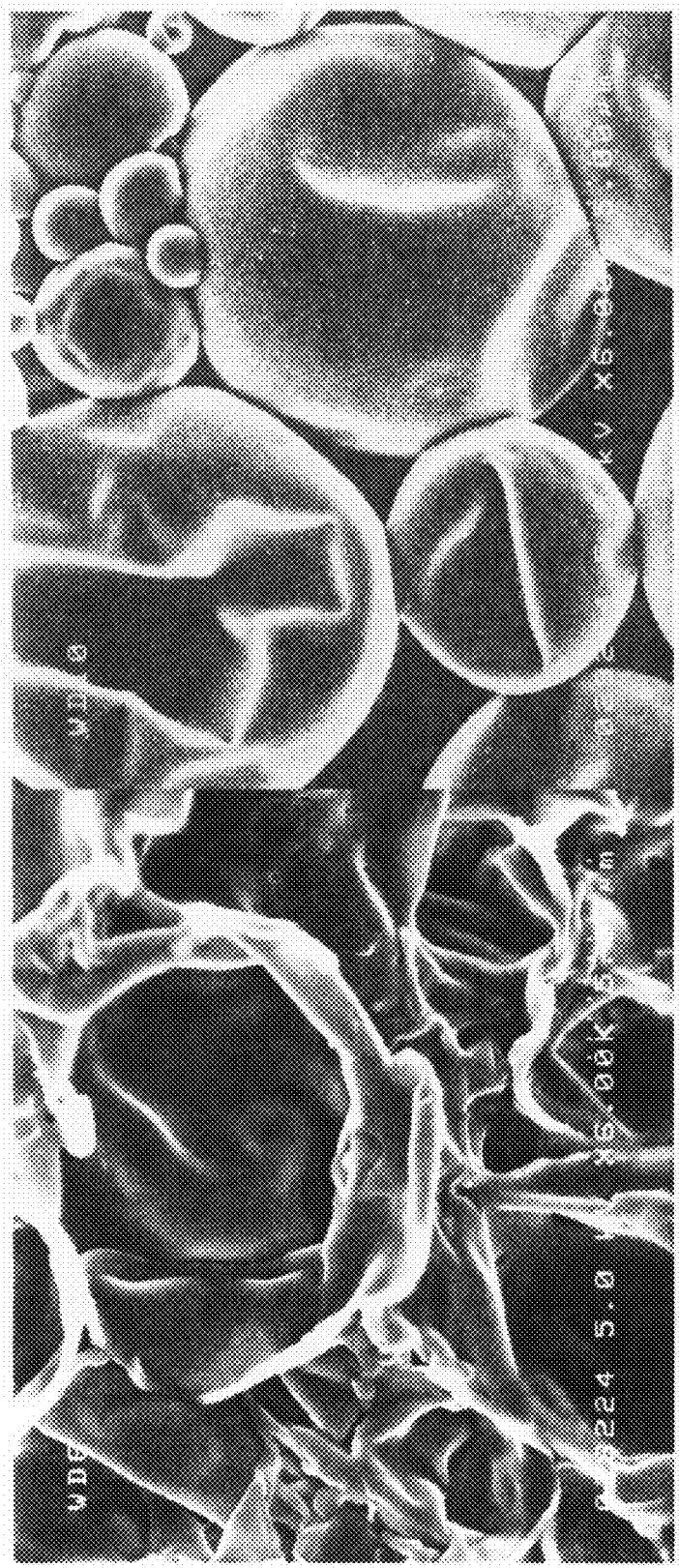
FIG. 12 shows SEM photomicrographs of the liquid crystal-containing composition in the liquid crystal display device obtained in Comparative Example 1.

The reflection spectra of the liquid crystal display device in bright and dark display states are measured immediately after preparation of the device and after storage at 55° C. for 1 hour. The results are shown in FIG. 11. The SEM photomicrographs of the liquid crystal-containing composition in the liquid crystal display device are shown in FIG. 12. The SEM photomicrographs show the inside (FIG. 12(A)) and outside (FIG. 12(B)) of the capsules.

Comparative Example 2

A liquid crystal display device is made in the same manner as Example 0, except that the particles are not hydrophobized upon the preparation of the oil phase composition.

Figure 13:
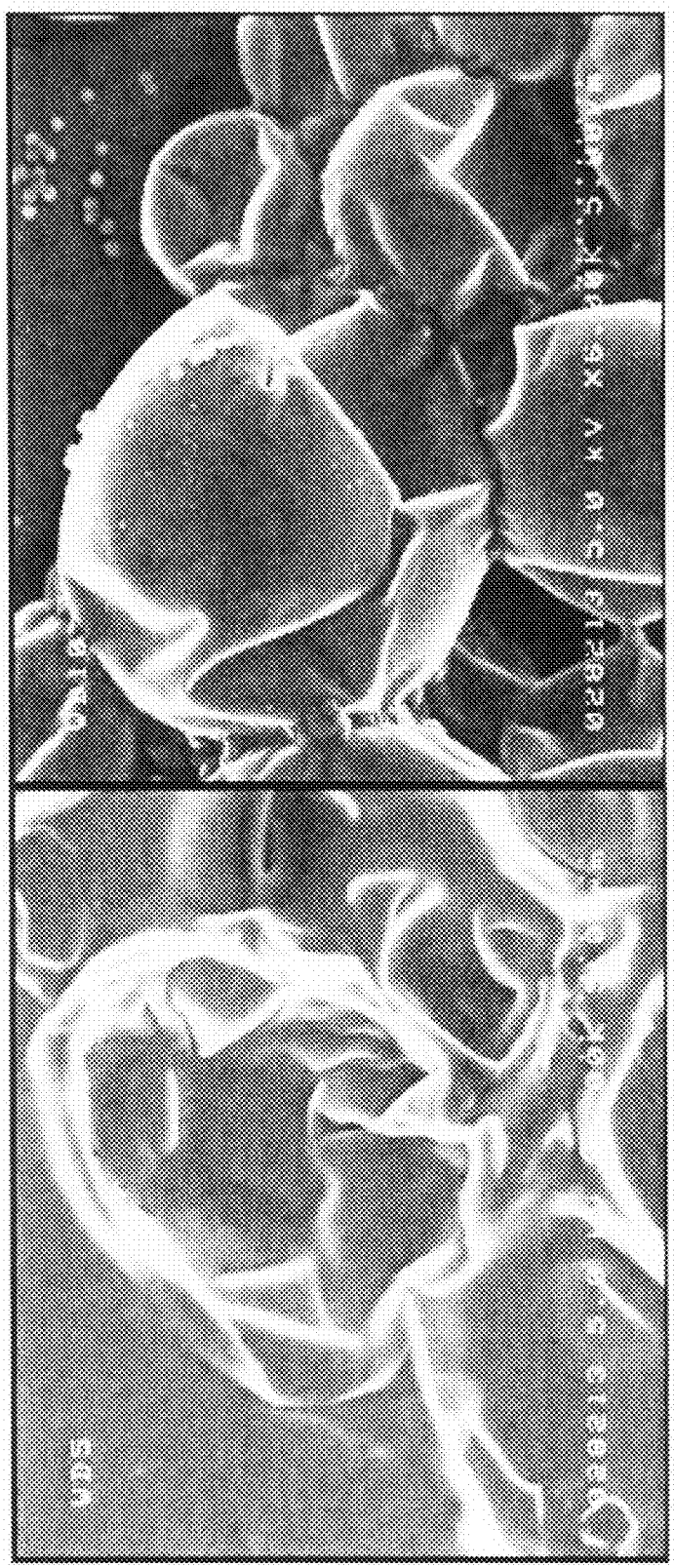
FIG. 13 shows SEM photomicrographs of the liquid crystal-containing composition in the liquid crystal display device obtained in Comparative Example 2.

The reflection spectra of the liquid crystal display device in bright and dark display states are measured immediately after preparation of the device and after storage at 55° C. for 1 hour. The results are shown in FIG. 11. The SEM photomicrographs of the liquid crystal-containing composition in the liquid crystal display device are shown in FIG. 13. The SEM photomicrographs show the inside (FIG. 13(A)) and outside (FIG. 13(B)) of the capsules.

(Evaluation)

The above-described Examples and comparative examples are measured for their particle density, and subjected to the following evaluations. The results are summarized in Table 1.

—Particle Density—

As described above, the density of particles being at the interface between the cholesteric liquid crystal and microcapsules is measured by using SEM.

—High-temperature Storage Stability—

The high-temperature storage stability is evaluated as follows. The luminous reflectance Yb before test and luminous reflectance Ya after test are measured using a spectrophotometer CM2022 (manufactured by Konica Minolta Holdings, Incorporated), and the rate of variability a is calculated by the following formula:

$$\alpha = (Ya - Yb)/Yb$$

As to the white reflectance, the rate of variability a in terms of absolute value less than 6% is rated as A, 6% or more and less than 15% is rated as B, and 15% or more is rated as C. As to the black reflectance, the rate of variability a in terms of absolute value less than 25% is rated as A, 25% or more and less than 60% is rated as B, and 60% or more is rated as C. These evaluations are summarized to perform comprehensive evaluation of the high-temperature storage stability on the basis of the following criteria:

A: Both the rates of variability of white reflectance and black reflectance are rated as A.

B: The rates of variability of white reflectance and black reflectance are rated as A and B, B and A, or B and B, respectively.

C: The evaluations of the rates of variability of white reflectance and black reflectance contain one or more C.

—Thermal Stability—

Thermal stability is evaluated as follows. The resistance values Ra and Rb of the liquid crystal display device subjected to a voltage having a frequency of 100 Hz are measured before and after storage at 70° C. for 500 hours, respectively, and the rate of variability β is calculated by the following formula:

$$\beta = Rb/Ra$$

The evaluation criteria are as follows:
A: $0.95 \leq \beta \leq 1.05$
B: $0.90 < \beta < 0.95$, $1.05 < \beta < 1.1$
C: Outside the above ranges —Electrical Stability—

Electrical stability is evaluated as follows. The resistance value of the liquid crystal display device subjected to a voltage having a frequency of 100 Hz is measured using IMPEDANCE ANALYZER SOLATRON SI-1260. The evaluation criteria are as follows:
A: 50M $\Omega/cm^2$ or more
B: Less than 50M $\Omega/cm^2$ and 10M $\Omega/cm^2$ or more
C: Less than 10M $\Omega/cm^2$ —Display Properties—

Addition of the particles may cause diffused reflection to increase the reflectance in the dark display state, which results in the degradation of the display properties. For this reason, the display properties are evaluated as follows. The luminous reflectance Y in the dark display state is measured using a spectrophotometer CM2022 (manufactured by Konica Minolta Holdings, Incorporated), and evaluated by the following evaluation criteria:
A: $Y \leq 5\%$
B: $5\% < Y \leq 10\%$
C: $Y > 10\%$

TABLE 1

| | Particle diameter (mm) | Amount of addition of particles (% based on liquid crystal) | Surface density (particle/$\mu m^2$) | High-temperature storage stability | Thermal stability | Electrical stability | Display properties |
|---|---|---|---|---|---|---|---|
| Example 0 | 120 | 2 | 3.3 | A | A | A | A |
| Example 2 | 120 | 2 | 4.2 | A | A | A | A |
| Example 3 | 120 | 2 | 3.7 | A | A | A | A |
| Example 4 | 120 | 2 | 3.3 | A | A | A | A |
| Example 5 | 120 | 2 | 3.2 | A | A | A | A |
| Comparative Example 1 | 120 | 0 | 0 | C | A | A | A |
| Comparative Example 2 | 120 | 2 | 0 | C | A | A | A |

The above-described results indicate that the Examples of the present invention exhibits higher high-temperature storage stability than comparative examples which contain no particle. This fact shows that the Examples of the present invention undergo less degradation of the display quality than comparative examples even when stored at high temperatures.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A liquid crystal-containing composition comprising:
   a cholesteric liquid crystal;
   a polymer, wherein the polymer encloses the cholesteric liquid crystal; and
   particles having hydrophobic surfaces, wherein the particles are at an interface between the cholesteric liquid crystal and the polymer.

2. The liquid crystal-containing composition according to claim 1, wherein the surfaces of the particles are hydrophobized with a hydrophobing agent.

3. The liquid crystal-containing composition according to claim 2, wherein the hydrophobing agent is applied to the particles in a range of from about 0.1 parts by mass to about 80 parts by mass with respect to 100 parts by mass of the particles.

4. The liquid crystal-containing composition according to claim 1, wherein the surfaces of the particles are modified by an alkyl group having 4 or more carbon atoms.

5. The liquid crystal-containing composition according to claim 1, wherein the surfaces of the particles are modified by silicone oil.

6. The liquid crystal-containing composition according to claim 5, wherein the number average molecular weight of the silicone oil is from about 1,000 to about 100,000.

7. The liquid crystal-containing composition according to claim 1, wherein the particles are inorganic particles.

8. The liquid crystal-containing composition according to claim 7, wherein the inorganic particles are metal oxide particles.

9. The liquid crystal-containing composition according to claim 1, wherein the particles are organic particles.

10. The liquid crystal-containing composition according to claim 1, wherein the average particle diameter of the particles is in a range from about 0.1 to about 5 times that of the spiral pitch of the cholesteric liquid crystal.

11. The liquid crystal-containing composition according to claim 1, wherein the density of the particles at the interface is from about 0.3 particles/$\mu m^2$ to about 20 particles/$\mu m^2$.

12. The liquid crystal-containing composition according to claim 1, wherein the polymer comprises microcapsules containing the cholesteric liquid crystal therein.

13. A liquid crystal display device comprising:
    a pair of electrodes; and
    the liquid crystal-containing composition according to claim 1 which is sandwiched between the pair of electrodes.

14. A method of producing a liquid crystal-containing composition comprising adding particles having hydrophobic surfaces to a mixture comprising a polymer or monomer units of the polymer and a cholesteric liquid crystal, such that the polymer encloses the cholesteric liquid crystal and the particles are at an interface between the cholesteric liquid crystal and the polymer.

* * * * *